H. J. WILDHAGEN.
SPRING WHEEL.
APPLICATION FILED SEPT. 1, 1908.

933,807.

Patented Sept. 14, 1909.

Witnesses

Inventor
Henry J. Wildhagen
By
Attorney

UNITED STATES PATENT OFFICE.

HENRY J. WILDHAGEN, OF PALATINE, ILLINOIS.

SPRING-WHEEL.

933,807.     Specification of Letters Patent.    Patented Sept. 14, 1909.

Application filed September 1, 1908. Serial No. 451,210.

*To all whom it may concern:*

Be it known that I, HENRY J. WILDHAGEN, a citizen of the United States, residing at Palatine, in the county of Cook and State of Illinois, have invented certain new and useful Improvements in Spring-Wheels, of which the following is a specification.

This invention relates to spring wheels, and has for its object to provide an improved device of the kind characterized particularly by an inner wheel or structure and an outer rim or structure, the latter being connected to the former by means of springs so that relative yielding or vibration is permitted.

The device has various other advantages with respect particularly to the means for supporting and guiding the parts relatively to each other, as will more fully appear from the following description and the accompanying drawings.

Figure 1:
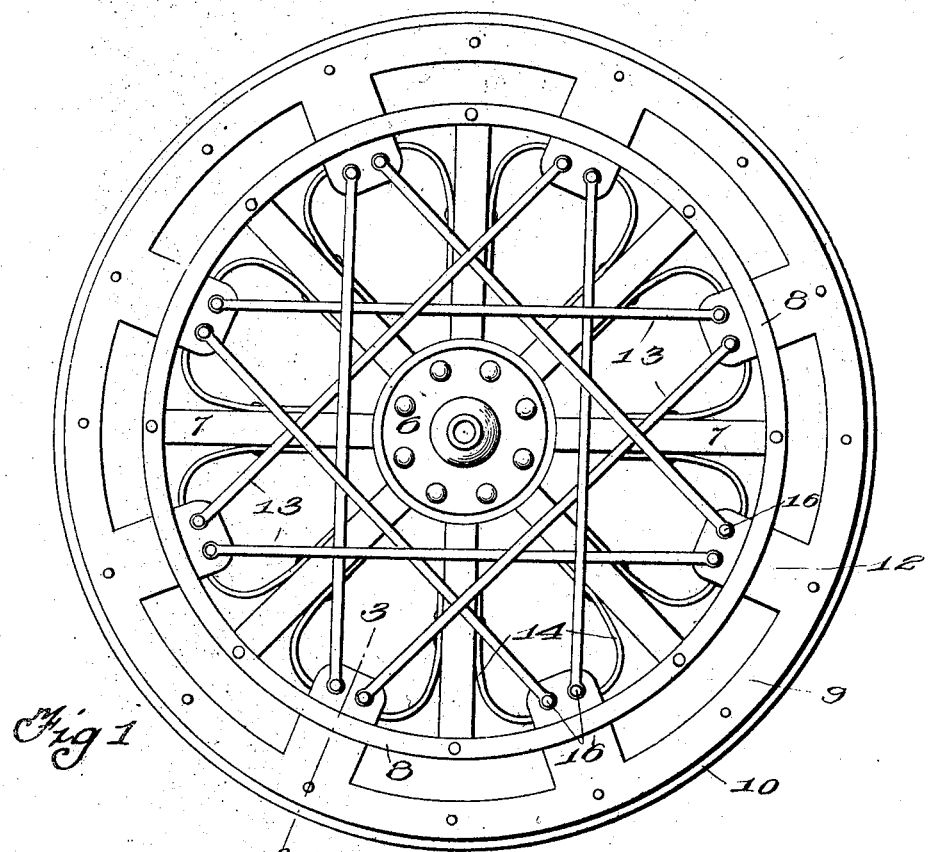
Figure 2:
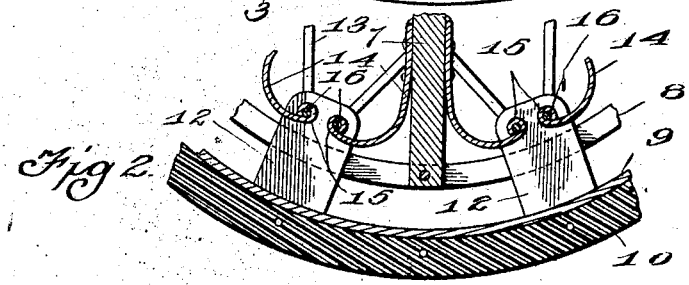
Figure 3:
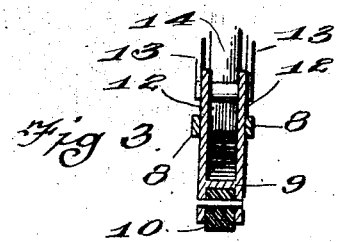

In the drawings, Figure 1 is a side elevation of the wheel; Fig. 2 is a detail in longitudinal section of the outer rim and adjacent parts of the inner structure; Fig. 3 is a section on the line 3—3 of Fig. 1.

Referring specifically to the drawings, the hub is indicated at 6, and may be of any suitable or desired construction. It supports or receives the inner ends of spokes 7 the outer ends of which are connected by rings 8, of which there is one on each side, so that a space is formed between said rings. The rim 9 of the wheel is preferably made of channel metal and receives a rubber tire 10, which, in consequence of the spring construction of the wheel may be made solid, thereby avoiding the disadvantages incident to a pneumatic tire. The rim is formed or provided with inwardly extending ears or projections 12, arranged in pairs or opposite to each other, at suitable distances apart around the wheel to correspond to the spaces between the spokes. These ears project inwardly within or between the rings 8 and work in contact therewith, whereby lateral play or movement is prevented. The outer rim structure is braced by rods 13 arranged angularly and symmetrically extending across from one side of the wheel to the other and to so brace the rim in all directions. The braces are provided on both sides of the wheel. The inner and outer wheel structures thus produced as described are connected together by means of springs 14 which are fastened at their inner ends to the opposite sides of the respective spokes, the springs being arranged in pairs between the spokes, and curved to produce the requisite elasticity, and fastened to the ears 12 by sleeves 15 at the ends thereof through which the bolts 16 extend, said bolts connecting the ears 12 and also serving the purpose of attaching the ends of the braces 13 to the ears. The ends of the springs are located between the ears 12 and preferably occupy the full width of the space.

It is obvious from the construction described that the outer rim structure is capable of movement or vibration with respect to the inner structure, and such movement is cushioned by the springs 14, which not only allow the vertical movement perpendicular to the pressure of the load, but will also allow the vertical movement at the middle line of the wheel. In other words the springs will yield in all directions in the plane of the wheel.

Various modifications may be made within the scope of the invention as defined in the following claims, and no limitation is implied by reason of the particular construction shown and described.

I claim:

1. A spring wheel comprising a central structure having spokes, spaced rings connecting said spokes on opposite sides of the outer ends thereof, a rim having pairs of opposite ears projecting inwardly between the said rings and working in contact therewith in the spaces between the spokes to prevent lateral play of the rim, springs fastened at their inner ends to the spokes and connected at their outer ends to bolts, said bolts extending transversely through the ears and provided with projecting ends, and brace rods extending angularly within the rim and connected at their ends to the projecting ends of said ear bolts.

2. A spring wheel comprising a central structure having spokes, spaced rings connecting said spokes on opposite sides of the outer ends thereof, a rim having pairs of opposite ears projecting inwardly between the rings, at points between said spokes, flat springs arranged in pairs and connected at their inner ends to opposing sides of respective ones of said spokes, and having inwardly curved outer ends connected to bolts, said bolts extending transversely through the ears, and provided with projecting ends, and 5 brace rods extending angularly within the rim and connected at their ends to the projecting ends of said ear bolts.

In testimony whereof, I affix my signature in presence of two witnesses.

HENRY J. WILDHAGEN.

Witnesses:
W<small>M</small>. J. R<small>OBINSON</small>,
N<small>ELLIE</small> F<small>ELTSKOG</small>.